(12) United States Patent
Ahmed et al.

(10) Patent No.: US 8,776,775 B2
(45) Date of Patent: Jul. 15, 2014

(54) SINGLE CAVITY RADIANT COOKING APPARATUS

(75) Inventors: Mallik Ahmed, Columbus, GA (US); Alex Gafford, Midland, GA (US)

(73) Assignee: W.C. Bradley Co., Columbus, GA (US)

( * ) Notice: Subject to any disclaimer, the term of this patent is extended or adjusted under 35 U.S.C. 154(b) by 1026 days.

(21) Appl. No.: 12/824,525

(22) Filed: Jun. 28, 2010

(65) Prior Publication Data
US 2011/0155118 A1 Jun. 30, 2011

Related U.S. Application Data

(60) Provisional application No. 61/221,436, filed on Jun. 29, 2009.

(51) Int. Cl.
*F23D 14/06* (2006.01)
(52) U.S. Cl.
USPC ........................................ 126/39 R
(58) Field of Classification Search
USPC ....... 126/2, 4, 9 R, 25 R, 39 D, 39 R, 40, 144
See application file for complete search history.

(56) References Cited

U.S. PATENT DOCUMENTS

| | | | |
|---|---|---|---|
| 1,158,986 A * | 11/1915 | Cronwall | 126/39 R |
| 1,399,704 A | 12/1921 | Eida | |
| 2,001,615 A * | 5/1935 | Karten | 126/275 R |
| 3,155,814 A | 11/1964 | Appleman et al. | |
| 3,245,458 A | 4/1966 | Patrick et al. | |
| 3,277,948 A | 10/1966 | Best | |
| 3,437,415 A | 4/1969 | Davis et al. | |
| 3,561,902 A | 2/1971 | Best | |
| 3,586,825 A | 6/1971 | Hurley | |
| 3,663,798 A | 5/1972 | Speidel et al. | |
| 3,683,058 A | 8/1972 | Partiot | |
| 3,941,117 A | 3/1976 | Pei et al. | |
| 4,024,839 A | 5/1977 | Reid, Jr. et al. | |
| 4,039,275 A | 8/1977 | McGettrick | |
| 4,057,670 A | 11/1977 | Scheidler | |
| 4,140,100 A | 2/1979 | Ishihara | |

(Continued)

FOREIGN PATENT DOCUMENTS

| | | |
|---|---|---|
| DE | 10215 688 A1 | 6/2003 |
| EP | 0 221 686 | 10/1986 |

(Continued)

OTHER PUBLICATIONS

Char-Broil, "Assembly Instructions for Models 6320, 6321 & 6323;", 1992, pp. 1-18.

(Continued)

*Primary Examiner* — John K Fristoe, Jr.
*Assistant Examiner* — Kevin E Lynn
(74) *Attorney, Agent, or Firm* — Dennis D. Brown; Brown Patent Law, P.L.L.C.

(57) ABSTRACT

An apparatus for cooking comprising a cooking cavity for receiving a food item and a burner positioned within a bottom portion of the cooking cavity for delivering a combustion gas in the cooking cavity which will flow upwardly to heat the vertically-extending interior surface of the cooking cavity. The upward flow of combustion gas within the heating cavity is operable for heating the vertically extending interior surface in a manner such that the food item positioned in the cooking cavity will be cooked at least predominantly by infrared radiation.

20 Claims, 4 Drawing Sheets

(56) References Cited

U.S. PATENT DOCUMENTS

| | | |
|---|---|---|
| 4,207,456 A | 6/1980 | Best |
| 4,235,023 A | 11/1980 | Best |
| 4,276,869 A | 7/1981 | Kern |
| 4,321,857 A | 3/1982 | Best |
| 4,375,802 A | 3/1983 | Wallasvaara |
| 4,403,541 A | 9/1983 | Berger |
| 4,403,597 A | 9/1983 | Miller |
| 4,426,792 A | 1/1984 | Best |
| 4,437,833 A | 3/1984 | Mertz |
| 4,508,097 A | 4/1985 | Berg |
| 4,537,492 A | 8/1985 | Lein et al. |
| 4,546,553 A | 10/1985 | Best |
| 4,569,657 A | 2/1986 | Laspeyres |
| 4,575,616 A | 3/1986 | Bergendal |
| 4,606,261 A | 8/1986 | Bernardi |
| 4,715,356 A | 12/1987 | Reynolds |
| 4,785,552 A | 11/1988 | Best |
| 4,798,192 A | 1/1989 | Maruko |
| 4,839,502 A | 6/1989 | Swanson et al. |
| 4,883,423 A | 11/1989 | Holowczenko |
| 4,886,044 A | 12/1989 | Best |
| 4,909,137 A | 3/1990 | Brugnoli |
| 5,024,209 A | 6/1991 | Schaupert |
| 5,028,760 A | 7/1991 | Okuyama |
| 5,062,408 A | 11/1991 | Smith et al. |
| 5,062,788 A | 11/1991 | Best |
| 5,111,803 A | 5/1992 | Barker et al. |
| 5,218,952 A | 6/1993 | Neufeldt |
| 5,230,161 A | 7/1993 | Best |
| 5,240,411 A | 8/1993 | Abalos |
| 5,277,106 A | 1/1994 | Raymer et al. |
| 5,279,277 A | 1/1994 | Barker |
| 5,306,138 A | 4/1994 | Best |
| 5,313,877 A | 5/1994 | Holland |
| 5,363,567 A | 11/1994 | Best |
| 5,488,897 A | 2/1996 | Snyder |
| 5,494,003 A | 2/1996 | Bartz et al. |
| 5,509,403 A | 4/1996 | Kahlke et al. |
| 5,513,623 A | 5/1996 | Hong |
| 5,566,607 A | 10/1996 | Schleimer |
| 5,567,459 A | 10/1996 | Gonzalez-Hernandez et al. |
| 5,571,009 A | 11/1996 | Stalhane et al. |
| 5,582,094 A | 12/1996 | Peterson et al. |
| 5,594,999 A | 1/1997 | Best |
| 5,676,043 A | 10/1997 | Best |
| 5,711,661 A | 1/1998 | Kushch et al. |
| 5,761,990 A | 6/1998 | Stewart et al. |
| 5,782,166 A | 7/1998 | Lin |
| 5,823,099 A | 10/1998 | Ko |
| 5,879,154 A | 3/1999 | Suchovsky |
| 5,890,422 A | 4/1999 | Clark et al. |
| 5,989,013 A | 11/1999 | Gray |
| 6,114,666 A | 9/2000 | Best |
| 6,159,001 A | 12/2000 | Kushch et al. |
| 6,190,162 B1 | 2/2001 | Smith et al. |
| 6,205,996 B1 | 3/2001 | Ryan |
| 6,461,150 B1 | 10/2002 | Sirand |
| 6,657,168 B1 | 12/2003 | Lazzer |
| 6,779,519 B2 | 8/2004 | Harneit |
| 6,783,226 B2 | 8/2004 | Szlucha |
| 7,202,447 B2 | 4/2007 | Kingdon et al. |
| 7,219,663 B2 | 5/2007 | Cuomo |
| 7,726,967 B2 | 6/2010 | Best |
| 2001/0036610 A1 | 11/2001 | Wood |
| 2002/0020405 A1 | 2/2002 | Coleman et al. |
| 2004/0011350 A1 | 1/2004 | Dowst et al. |
| 2004/0060552 A1 | 4/2004 | Yamada et al. |
| 2004/0152028 A1 | 8/2004 | Singh et al. |
| 2004/0250688 A1 | 12/2004 | Farkas et al. |
| 2005/0226976 A1 | 10/2005 | Chung |
| 2006/0003279 A1 | 1/2006 | Best |
| 2006/0021517 A1 | 2/2006 | Best |
| 2006/0266979 A1 | 11/2006 | Ra |
| 2007/0125357 A1 | 6/2007 | Johnston |
| 2008/0072890 A1 | 3/2008 | Best |
| 2008/0121117 A1* | 5/2008 | Best ............................. 99/339 |

FOREIGN PATENT DOCUMENTS

| | | |
|---|---|---|
| EP | 1 028 292 A1 | 8/2000 |
| EP | 1 096 203 | 5/2001 |
| FR | 1.129.123 | 1/1957 |
| FR | 1 204 968 | 1/1960 |
| FR | 1387132 | 1/1965 |
| FR | 70 02058 | 9/1971 |
| FR | 2472141 | 12/1980 |
| GB | 23552 | 0/1915 |
| GB | 432481 | 12/1933 |
| GB | 562136 | 6/1944 |
| GB | 576377 | 4/1946 |
| GB | 1029774 | 7/1963 |
| GB | 1339345 | 12/1973 |
| GB | 2 362 451 | 11/2001 |
| GB | 2 409 265 | 6/2005 |
| JP | 2000 121064 | 4/2000 |
| JP | 2004 179089 | 6/2004 |
| WO | WO 2004103133 A1 | 12/2004 |
| WO | WO 2006080949 A2 | 8/2006 |
| WO | WO 2008125258 A2 | 10/2008 |

OTHER PUBLICATIONS

PCT/US2010/040200, "International Search Report and Written Opinion", Aug. 19, 2010, Applicant: W.C. Bradley Co., Published in: WO.

P. Sheridan, et al., "Application of Far Infra-Red Radiation to Cooking of Meat Products", 1999, pp. 203-208 (Abstract Only), vol. 41, No. 3/4, Publisher: Journal of Food Engineering, Published in: US.

Sheridan, et al., "Application of Far Infra-Red Radiation to Cooking of Meat Products", 1999, pp. 2003-2008, vol. 41, Publisher: Journal of Food Engineering, Published in: US.

Sheridan, et al., "Analysis of Yield While Cooking Beefburger Patties Using Far Infrared Radiation", 2002, pp. 3-11, vol. 51, Publisher: Journal of Food Engineering, Published in: US.

N.C. Shilton, et al., "Determination of the Thermal Diffusivity of Ground Beef Patties Under Infrared Radiation Oven-Shelf Cooking", Mar. 2002, pp. 39-45 (Abstract Only), vol. 52, No. 1, Publisher: Journal of Food Engineering, Published in: US.

N. Shilton, et al., "Modeling of Heat Transfer and Evaporatie Mass Losses During the Cooking of Beef Patties Using Far-Infrared Radiation", 2002, pp. 217-222 (Abstract Only), vol. 55, No. 3, Publisher: Journal of Food Engineering, Published in: US.

Y. Takahashi, et al., "Impact of IR Broiling on the Thiamin and Riboflavin Retention and Sensory Quality of Salmon Steaks for Foodservice Use", 1987, pp. 4-6 (Abstract Only), vol. 52, No. 1, Publisher: Journal of Food Science, Published in: US.

"Cross Section of G3000 Cabinet Unit", Sep. 4, 2001, Publisher: Thermal Engineering Corp., Columbia, SC, Published in: US.

"Cross Section of G-Series Burner System", Sep. 4, 2001, Publisher: Thermal Engineering Corp., Columbia, South Carolina, Published in: US.

* cited by examiner

SINGLE CAVITY RADIANT COOKING APPARATUS

This application claims the benefit of U.S. Provisional Patent Application Ser. No. 61/221,436, filed on Jun. 29, 2009, and incorporates said provisional Application Ser. No. 61/221,436 by reference into this document as if fully set out at this point.

FIELD OF THE INVENTION

The present invention relates to apparatuses for cooking food items using infrared energy.

BACKGROUND OF THE INVENTION

Recent developments in cooking large pieces of meat, such as whole fowl, large cuts of beef or pork, and so on, have centered on the use of radiant heat, such as described in U.S. Patent Publication No. 2008/0121117, to Best, for a Radiant Tube Broiler. Best teaches the use of a removable emitter tube, the interior of which forms a first cavity (i.e., a cooking cavity) wherein the food item is positioned and cooked. The emitter tube must be placed inside an outer tube to thereby form a second cavity (i.e., a heating cavity) between the interior wall of the outer tube and the exterior wall of the inner tube. In this "double cavity" system, a heating unit delivers hot combustion gas into the bottom of the outer heating cavity in order to heat the outer surface of the emitter tube. This heat must then be conducted through the wall of the emitter tube to the inner surface of the tube so that infrared radiation is then emitted from the inner surface for cooking the food inside the emitter tube (i.e., the inside cooking cavity). An actual product, Char-Broil's The Big Easy®, has been made, marketed, and sold using this technology and successfully cooks large pieces of meat effectively.

As is typically the case, however, further developments, advancements, and modifications in radiant tube broiler technology would be very desirable for improving upon the structure, operation, weight, efficiency, and/or cost of the prior art system described above. For example, in the existing double cavity system, a significant amount of warm-up time is needed for the heating system to bring food to cooking temperature because the emitter tube acts as a thermal barrier. Tests were conducted on a Char-Broil The Big Easy® double cavity apparatus showing that it took 16 minutes after start-up of the prior art double cavity apparatus to reach a stable air temperature and radiant wall temperature within the emitter tube (i.e., a point of thermal equilibrium). The radiant heat flux within the cooking cavity of the emitter tube at the point of thermal equilibrium was 4.3 KW/m$^2$ with an exhaust gas temperature of 770° F.

Also, the double cavity construction of the prior system is heavy, making portability of a turkey-sized unit difficult.

In addition, in the prior double cavity system, because of the temperature to which the removable emitter tube is exposed as a result of (a) the nature of the heating chamber surrounding the tube, (b) the necessity of conducting heat through the wall of the emitter tube, and (c) the need to angle the burner flame toward the emitter, it has been necessary to form the emitter tube from stainless steel or other heavy materials having a comparable degree of heat resistance. Again, tests conducted on a prior art double cavity Char-Broil The Big Easy® apparatus showed that, at the point of thermal equilibrium discussed above, the removable emitter tube reached a temperature of close to 800° F. At a temperature of this magnitude, the coating of aluminum on an aluminized steel structure begins to fail and loses its ability to protect the steel from corrosion. Consequently, in the prior art double cavity apparatus it has been necessary to form the removable emitter tube from stainless steel or a similar heat resistant material such as porcelanized steel. Stainless steel has been the material preferred for use in forming the emitter tube because porcelanized steel, which is also more expensive than aluminized steel, is susceptible to chipping damage.

In addition to the cost inherent in the use of stainless steel, the weight of a double cavity radiant tube broiler having a stainless steel emitter tube sized for cooking a 25 lb. turkey will typically be about 31 lbs. Moreover, the weight of the stainless steel emitter tube alone is about 5 lbs.

SUMMARY OF THE INVENTION

Figure 1:
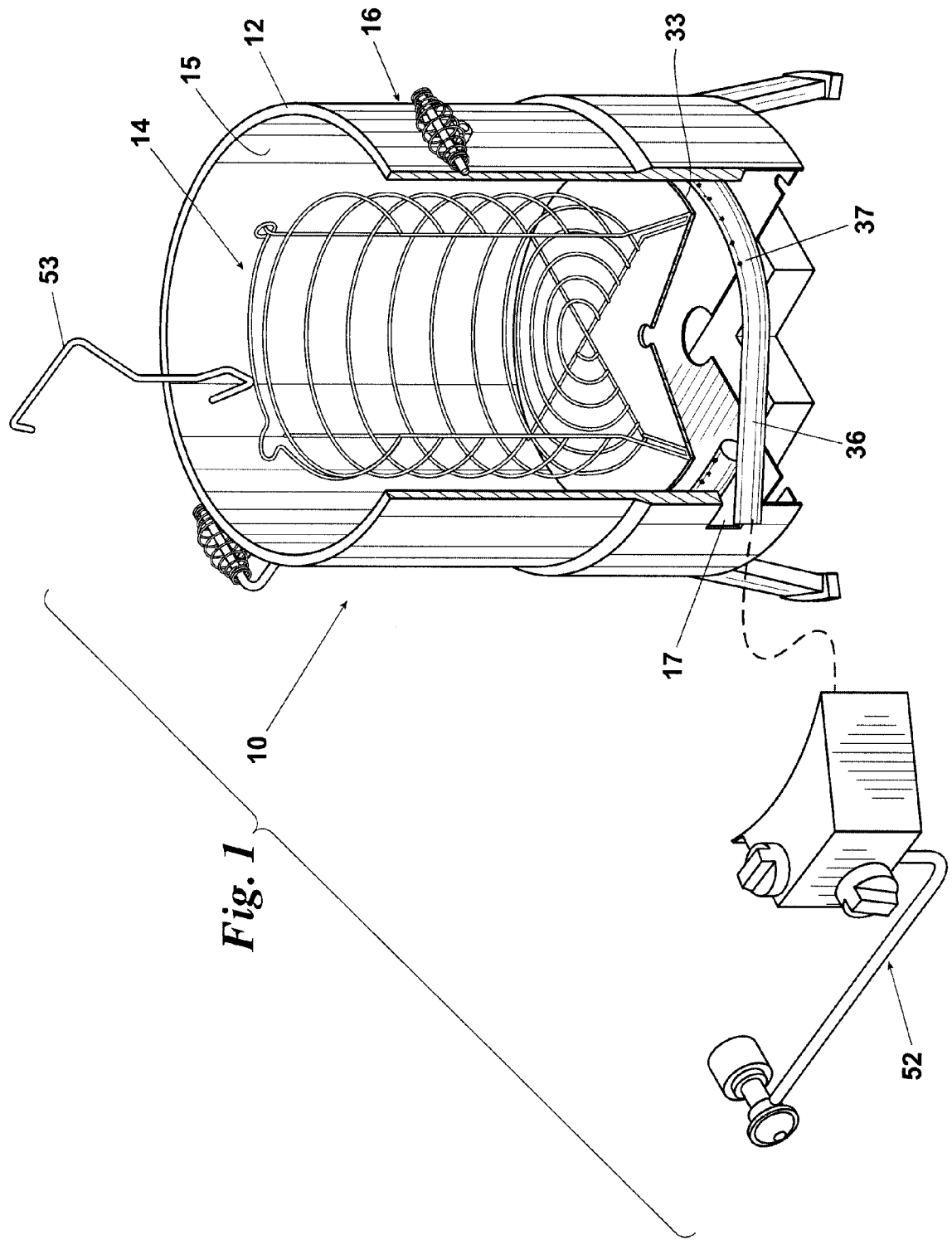
FIG. 1 shows a cutaway perspective view of an embodiment 10 of an inventive single cavity infrared (IR) cooking apparatus with a ring burner 36 shown at the bottom and a generally cone-shaped baffle shown above it directing the hot gas toward the inside wall of the cooking cavity 14 which is illustrated having two walls to increase thermal insulation.

The invention relates to an alternative way of achieving mostly radiant cooking of large pieces of meat. The double cavity formerly required is eliminated, but the inventive system achieves similar results with only a single cavity. In fact, the inventive single cavity apparatus produces more actual radiant heat and more total cooking heat in the cooking cavity than are provided by the prior art double cavity appliance.

The invention preferably utilizes a ring-type burner within the bottom of a vertical cylindrical cooking cavity. The hot gas produced from the ring-type burner flows upward along the vertical interior wall of the cylinder, directly heating the interior vertical wall by convection. The heated interior wall then in turn operates as the emitting surface from which infrared energy is emitted to cook the food product within the cooking cavity. The outer surface of the cooking cavity can be bare or may be insulated by a double wall construction, or by special material, or both as required for maximizing performance.

The inventive single cavity system cooks food by both convective and radiative heat. As the convective hot gas is inside the cylinder (i.e., the cooking cavity), some of the hot gas may diffuse inwardly and also functions to heat up the food. However, the interior wall of the cavity is operable for heating a large piece of food placed in the center predominately by radiation (i.e., by more than 50% radiation). The inventive single cavity apparatus is preferably operable such that at least 50% (more preferably at least 52% and most preferably at least 55%) of the cooking energy delivered to the product will preferably be infrared energy.

Various means may be used to optimize flow along the inner wall of the single cavity. These include locating a baffle at the bottom of the cavity (e.g., cylinder) so that the baffle routes air from the burner in a direction upward and outward toward the inner wall of the cavity. The baffle may be shaped, e.g., cone shaped, to route drippings from the food to the center where the drippings can be evacuated though a hole. The baffle can also be configured as a shield to protect burner ports from food drippings. Other means to optimize flow might also include a baffle at the top of the cavity (e.g., cylinder) that has an annular vent or series of holes, the outer edges of which are preferably aligned with the inner edge of the cavity so that the exit of hot gas at the top of the cylinder is vertically above the point it is produced at the bottom of the cylinder. The upper baffle thus reduces the inward flow of hot gas to the food being cooked that would otherwise be created by expansion of the heated gas, thereby decreasing somewhat the convective contribution to cooking. Or, both upper and lower baffles can be used in combination.

In a first aspect, there is provided a single cavity radiant cooking appliance preferably comprising: (a) a wall forming a vertical boundary around the cavity, wherein the wall is preferably cylindrical and optionally additionally comprising an outer wall surrounding said wall; (b) a top surface (i.e., a cover) in contact with an upper end of the wall, the top surface having a plurality of top surface perforations proximate the periphery of the top surface; and (c) a bottom surface in contact with the lower end of the wall, the bottom surface having a plurality of bottom surface perforations proximate the periphery of the bottom surface, the bottom surface further defining a central orifice. The wall, the top surface and the bottom surface define said cavity.

This single cavity radiant cooking appliance preferably further comprises: (d) a support bracket extending upwardly from the bottom surface; (e) a bottom baffle supported by the support bracket, the bottom baffle preferably being cone-shaped and defining a central drain hole, the bottom baffle having a perimeter that is spaced a distance away from the wall for forming a gap between the perimeter of the bottom baffle and the wall; (f) a ring burner above the bottom surface, the ring burner comprised of an elongate member adjacent an inside surface of the wall, the ring burner at least partially located below the gap; (g) a cage having a bottom and side structures, the cage for lowering into the cavity and for resting on the bottom baffle, the cage provided to contain a piece of meat; (h) an upper baffle, the upper baffle preferably being cone-shaped (and optionally defining a central drain hole), the upper baffle having a flange member that rests on the upper end of the wall, the flange member defining a plurality of top surface perforations, wherein the top surface perforations are adjacent to the inside surface of the wall and above at least a portion of said ring burner; (i) a drain pan below the bottom surface, the drain pan for receiving liquids that drain off of the central drain hole of the bottom baffle and through the central orifice of the bottom surface; and (j) handles affixed to the wall.

In a second aspect, there is provided an apparatus for cooking preferably comprising: (a) a cooking cavity for receiving a food item, the cooking cavity having a vertically extending interior surface which will surround and face the food item when the food item is received in the cooking cavity and (b) a burner positioned within a bottom portion of the cooking cavity for delivering a combustion gas in the cooking cavity which will flow upwardly to heat the vertically extending interior surface. The burner is preferably configured and oriented for delivering the combustion gas in the cooking cavity to heat the vertically extending interior surface in a manner effective such that the apparatus is operable for cooking the food item in the cooking cavity at least predominantly by infrared radiation.

In this second aspect, the apparatus is preferably further characterized in that: the cooking cavity has a top opening at an upper end thereof for receiving the food item; the apparatus further comprises a cover removably positionable over the top opening; and the cover has a plurality of perforations for discharging the combustion gas from the cooking cavity. The perforations are preferably located in a peripheral portion of the cover in a manner effective such that, when the cover is placed over the top opening, the perforations will be positioned adjacent the vertically extending interior surface and will operate to at least reduce an amount of the combustion gas which diffuses inwardly in the cooking cavity and contacts the food item. The cover also preferably comprises a substantially conical baffle which diverges upwardly toward the perforations.

Also, the apparatus will preferably be characterized such that: the vertically extending interior surface of the cooking cavity is substantially cylindrical; the perforations in the cover are configured in a ring arrangement in the peripheral portion of the cover; the burner is a ring burner positioned adjacent to the vertically extending surface; and the ring arrangement of the perforations is positioned substantially directly above and in vertical alignment with the ring burner.

Alternatively or in addition, this apparatus will preferably be further characterized in that: the apparatus further comprises a baffle positioned in a lower portion of the cooking cavity; the baffle has a peripheral edge which is spaced apart from the vertically extending interior surface such that a gap is formed between the peripheral edge of the baffle and the vertically extending interior surface; the gap substantially surrounds and most preferably entirely surrounds the baffle and is positioned elevationally above the burner; and the combustion gas from the burner is delivered upwardly through the gap. As used herein and in the claims, the term "substantial surrounds" means surrounding at least 90% of the structure or feature in question.

Also, the vertically extending interior surface of the cooking cavity will preferably be substantially cylindrical and the baffle will preferably have an upwardly diverging conical shape (or frusto-conical shape as, e.g., in the case of the conical baffle with a circular drain hole at the bottom thereof). Additionally, the burner will preferably be a ring burner positioned adjacent to the vertically extending interior surface and the combustion gas will preferably be delivered through the gap between the baffle and the vertical interior surface in an upward flow such that the upward flow of the combustion gas substantially surrounds and most preferably entirely surrounds the peripheral edge of the baffle.

In a third aspect, there is provided an apparatus for cooking comprising: (a) a cooking cavity having a top opening for receiving a food item, the cooking cavity having a vertically extending interior surface which will surround and face the food item when the food item is received in the cooking cavity; (b) a burner positioned within a bottom portion of the cooking cavity for delivering a combustion gas in the cooking cavity; (c) a baffle positioned in a lower portion of the cooking cavity, the baffle having a peripheral edge which is space apart from the vertically-extending interior surface such that a gap is formed between the peripheral edge of the baffle and the vertically-extending interior surface wherein the gap substantially surrounds the baffle and the gap is elevationally positioned above the burner; and (d) a cover removably positionable over the top opening of the cooking cavity, the cover having one or more (preferably a plurality of) perforations located in a peripheral portion of the cover for discharging the combustion gas from the combustion cavity.

In this apparatus, the burner and baffle are also preferably configured and positioned in a manner effective such that the combustion gas will be delivered through the gap in an upward flow which will substantially surround the peripheral edge of the baffle. In addition, the burner, the baffle, and the one or more perforations are preferably configured and positioned to cause the apparatus to be operable such that the upward flow of the combustion gas from the gap will heat the vertically-extending interior surface in a manner effective such that at least 50% of all cooking energy delivered to the food item in the cooking cavity will be infrared energy. Further, the upward flow of the combustion gas from the gap will preferably heat the vertically-extending interior surface in a manner effective such that, at an exhaust gas temperature of not more than 720° F., preferably not more than 700° F., an infrared radiant emission level of at least 4.3 KW/m$^2$ in the cooking cavity is reached in not more than 10, and more preferably not more than 8, minutes.

It is also preferred that (a) the vertically extending interior surface of this apparatus is an interior surface of a vertically-extending wall and (b) the upward flow of combustion gas from the gap will heat the vertically-extending interior surface in a manner such that an infrared radiant emission level of at least 5 KW/m$^2$ in the cooking cavity will be provided without the vertically-extending wall exceeding a temperature of 650° F. and more preferably not exceeding a temperature of 600° F.

Further aspects, features, and advantages of the present invention will be apparent to those of ordinary skill in the art upon examining the accompanying drawings and upon reading the following Detailed Description of the Preferred Embodiments.

DETAILED DESCRIPTION OF THE PREFERRED EMBODIMENTS

Figure 2:
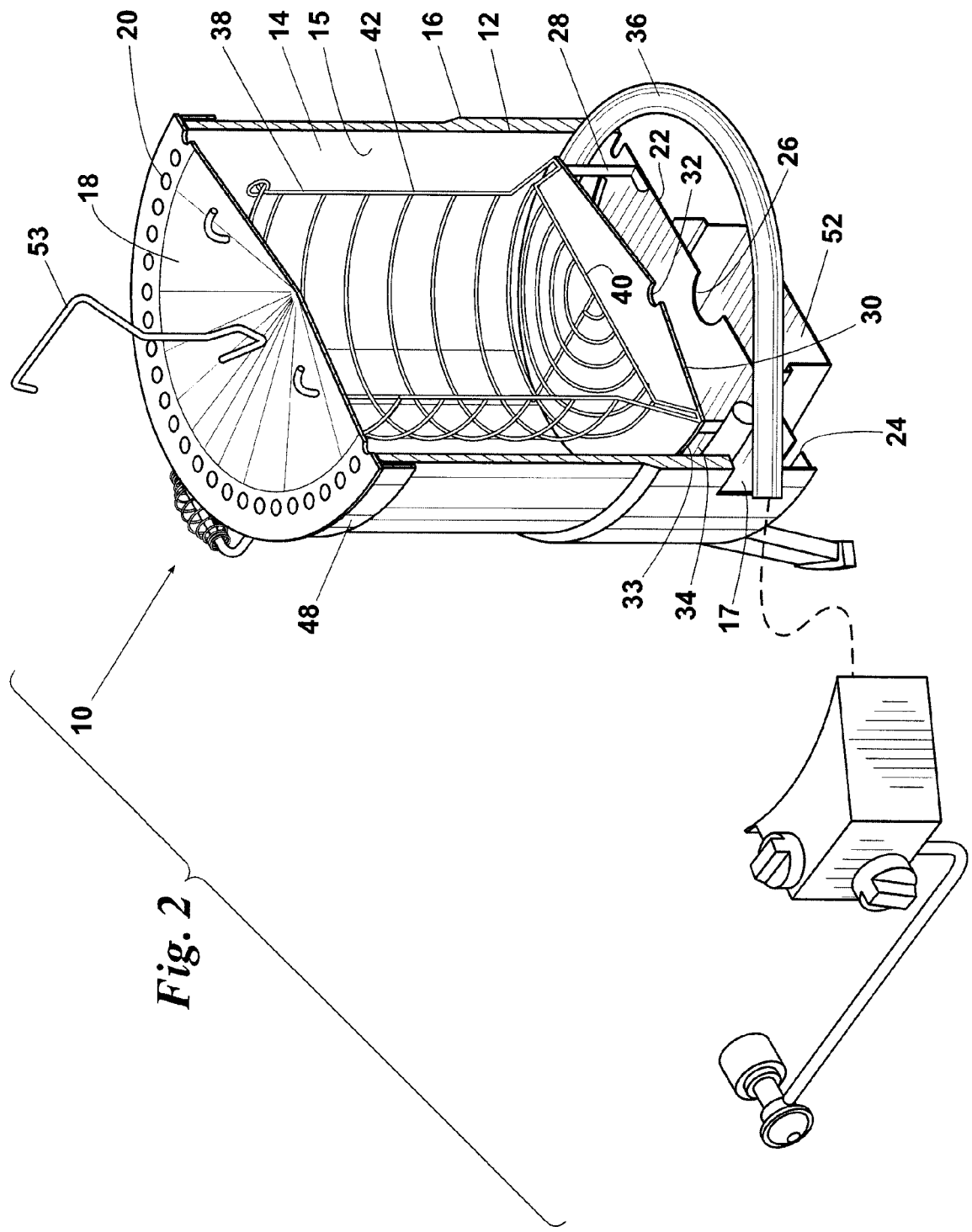
FIG. 2 is another cutaway perspective view showing the apparatus 10 of FIG. 1 assembled with a top baffle 18 in place.
Figure 3:
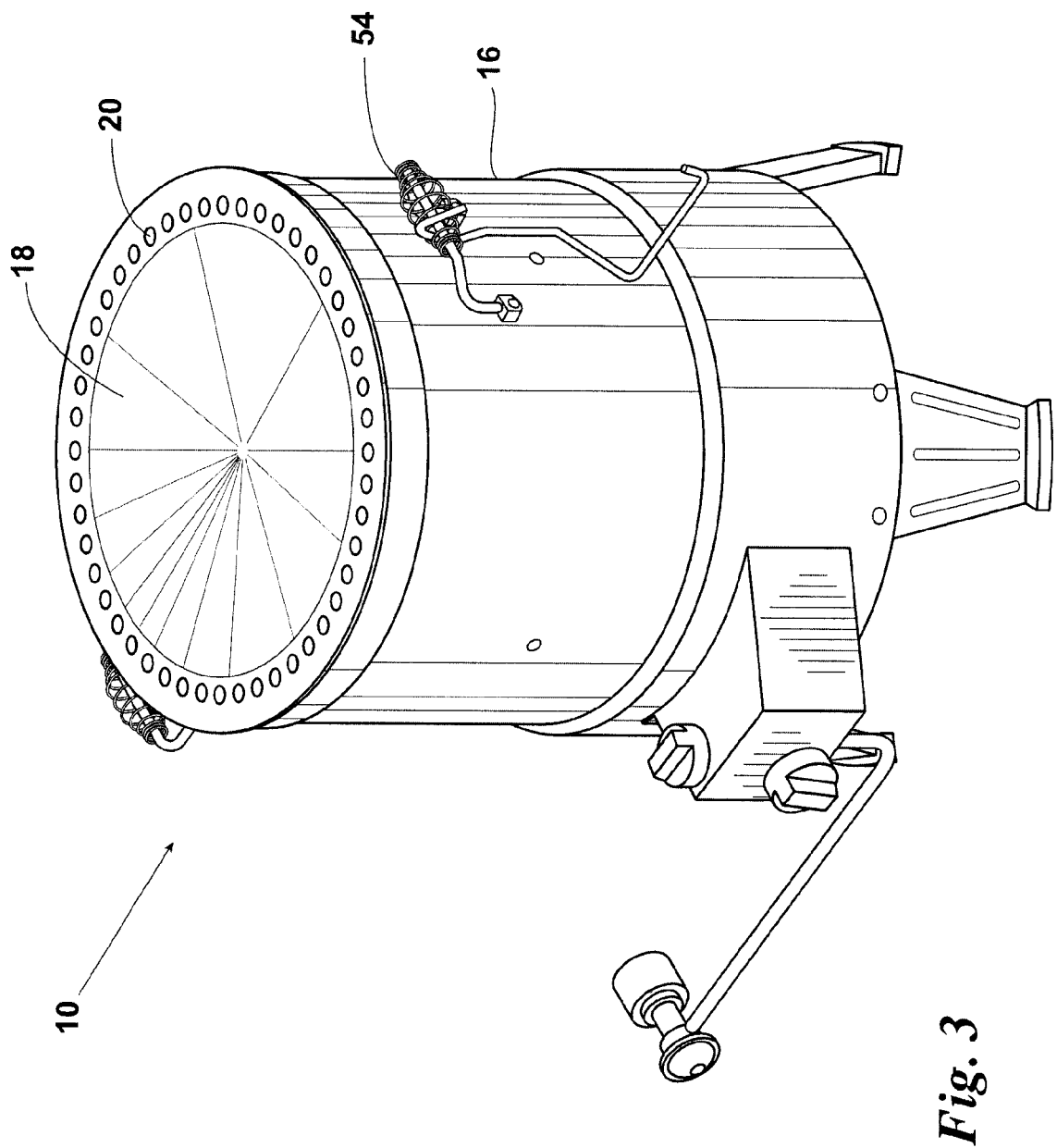
FIG. 3 is a perspective view of the inventive apparatus 10.

Referring now to FIGS. 1-3, shown is a single cavity radiant tube cooking appliance designated generally 10. Appliance 10 includes a vertical wall 12 having a vertical interior emitting surface 15 that forms and constitutes a vertical boundary around a cooking cavity 14. In a preferred embodiment, wall 12 is cylindrical, although other shapes including a hexagonal tube, an octagonal tube, a cube or rectangular tube, or other shapes may also be utilized. In a preferred embodiment, appliance 10 additionally includes an outer insulating wall 16 that surrounds wall 12.

An upper baffle 18, which also constitutes a removable cover for the heating cavity 14, is preferably located on an upper end of wall 12 and/or wall 16. Upper baffle 18 preferably defines a plurality of top surface perforations 20 proximate to a periphery of upper baffle 18.

A bottom surface 22 is affixed to a lower end of wall 16. Bottom surface 22 defines a plurality of bottom surface perforations 24 formed proximate to a periphery of bottom surface 22. Bottom surface 22 further defines central orifice 26. Wall 12 and bottom surface 22 together define the cooking cavity 14.

A support bracket 28 extends upwardly from bottom surface 22. A bottom baffle 30 is supported within the cooking cavity 14 by support bracket 28. Bottom baffle 30 is preferably cone-shaped and defines a central drain hole 32. Bottom baffle 30 has a perimeter (i.e., a peripheral edge 33) that is spaced a distance away from wall 12, thereby forming gap 34 between the perimeter of bottom baffle 30 and wall 12. The cone-shaped baffle 30 directs gas flow within the cooking cavity 14 through gap 34 where the gas may flow upward adjacent wall 12. The peripheral edge 33 and the gap 34 are preferably circular.

A burner, preferably a ring burner 36, is located within the cooking cavity 14 above bottom surface 22. Ring burner 36 is formed, for example, from an elongate tubing or other conduit and is adjacent to the inside surface 15 of wall 12. Ring burner 36 defines a plurality of perforations 37 on an upper surface of the burner ring for allowing gas to escape to sustain a flame fueled by the gas. Perforations 24 are preferably provided through the bottom surface (floor) 22 of the cooking cavity 14 and are preferably positioned substantially beneath the ring burner 36 to provide secondary air for combustion. Ring burner 36 is preferably at least partially located beneath gap 34 and preferably has an inlet extending outwardly through opening 17 as shown in FIGS. 1 and 2. Most preferably, the upper flame discharge perforations 37 of the ring burner 36 will be oriented and positioned for discharging a fuel or fuel/air mixture directly upward toward gap 34 adjacent to the vertical interior surface 15 of the cooking cavity 14.

Cage 38 is provided having a bottom 40 and side structures 42. Cage 38 is for lowering into cavity 14. Cage 38 preferably rests on bottom baffle 30. Cage 38 is provided to contain a piece of meat or other food item(s) for cooking.

Figure 4:
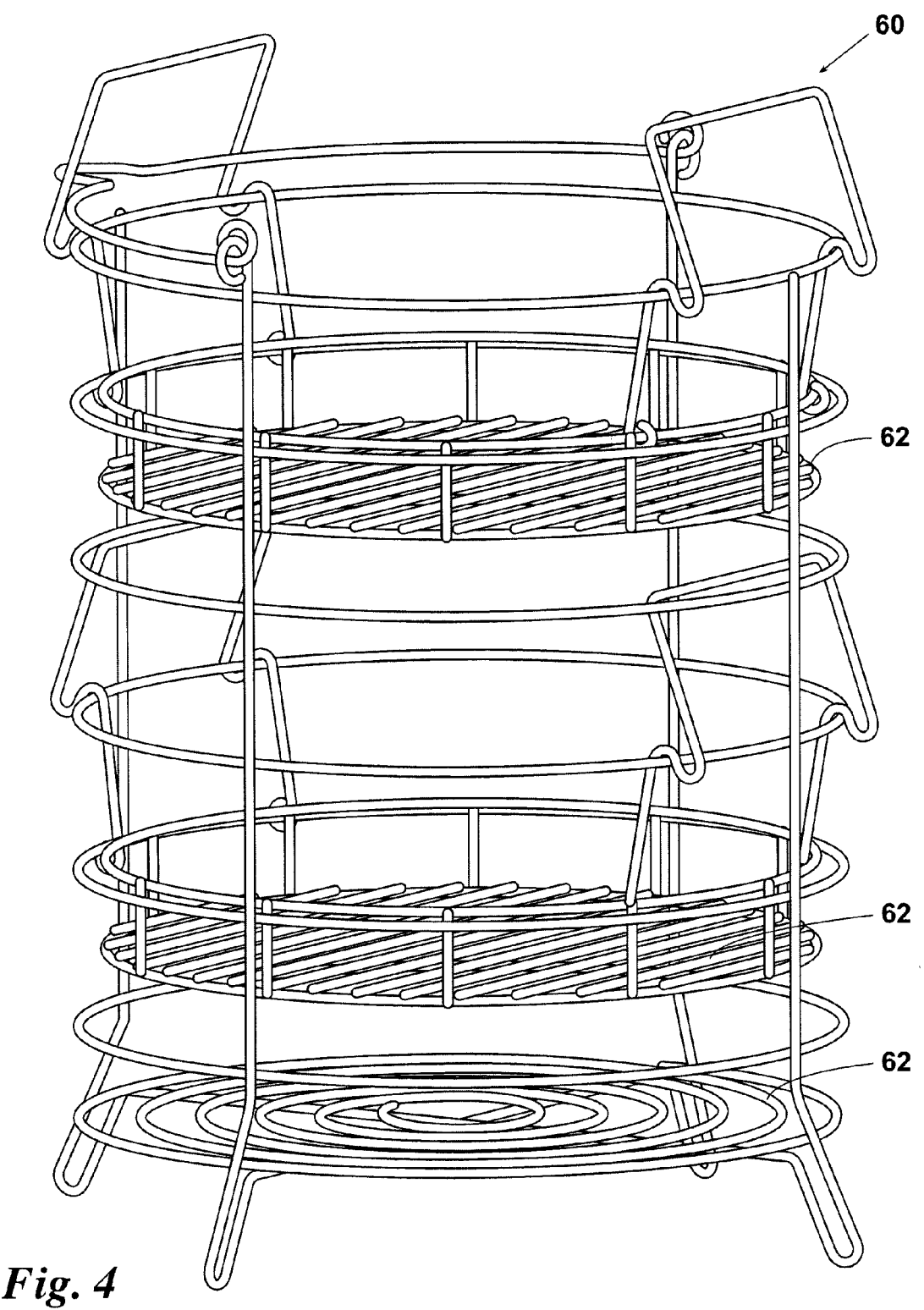
FIG. 4 is a perspective view of an alternative food support structure 60 having a plurality of vertically spaced tiers 62 for simultaneously supporting and cooking multiple food items within the inventive cooking apparatus 10.

An example of an alternative food support structure 60 which can be used in the inventive apparatus 10 is shown in FIG. 4. The alternative support 60 has a plurality of horizontal, vertically spaced tiers (e.g., wire grates) 62 which can support multiple food items for simultaneously cooking the multiple food items within the cooking cavity 14. The nature of the infrared emission and reflection which occurs with the cooking cavity 14 of the inventive apparatus 10 is such that all products on each tier 62 will be cooked evenly.

Upper baffle 18 is also preferably cone-shaped. Upper baffle 18 operates as a cover for the cooking cavity 14 and preferably includes a flange member 48 that rests on the upper end of cavity 14 and/or wall 16. Flange member 48 preferably defines a plurality of top surface perforations 20. Top surface perforations 20 are preferably adjacent to the inside surface 15 of wall 12 and are preferably located above at least a portion of ring burner 36. The ring of top vent openings 20 provided in the peripheral portion of the upper baffle 18 will preferably be located substantially directly above the ring of flame discharge perforations 37 provided around the top of the burner ring 36.

Drain pan 52 is preferably located below bottom surface 22. Drain pan 52 is provided for receiving liquids that drain through central drain hole 32 of bottom baffle 30 and through central orifice 26 of bottom surface 22.

Preferably, exterior handles 54 are affixed to wall 12 or outer wall 16 for handling the entire appliance 10.

Upper baffle 18 may be equipped with handles for removal in order to place cage 38 with food into cavity 14 for cooking. The handle could be of the same form as handles 54 or, for example, could be in the form of loops or eyes to receive the hook of a cage handling tool 53.

In order to supply gas to burner 36, a gas supply and ignition module 52 (e.g., a conventional gas supply and ignition module 52 as shown in the drawings) will be secured to the exterior of the apparatus 10 in connection with the inlet of the ring burner element 36 of the inventive apparatus 10.

In the case of a unit sized for cooking a 25 lb. turkey, due primarily to the elimination of the need to use a separate removable emitter cavity in the inventive apparatus 10, the total weight of the inventive system 10 is reduced by about 4 lbs., as compared to the prior art double cavity broiler. In addition, although the wall 12 of the cooking cavity 14 of the inventive apparatus 10 can be formed of stainless steel, the wall 12 can alternatively be formed of a much lighter and less expensive material such as, e.g., aluminized steel.

The ability to use a much lighter and less expensive material such as aluminized steel in the inventive apparatus 10 results from the fact that (a) the convective flow of combustion gas through the cooking cavity 14 of the inventive apparatus 10 preferably travels upwardly in contact with the interior surface 15 of the cavity wall 12 without substantial impingement and (b) the maximum temperature of the interior surface 15 of the cavity wall 12, or any other portion of the cavity wall 12 of the inventive apparatus 10, will preferably not exceed 650° F. The cavity wall 12 more preferably will not exceed 600° F. and most preferably will not exceed 550° F. In contrast, in the prior art double cavity broiler, the wall of the removable emitter tube may be heated to a temperature of as much as 785° F. or more.

In the inventive apparatus 10, the only component which may be required to be formed of stainless steel or other comparably heat resistant material is the lower baffle 30. Examples of materials suitable for forming the vertically extending cooking cavity wall 12 include, but are not limited to, stainless steel, aluminized steel, porcelanized steel, and ceramic coated steel. Examples of materials suitable for use in forming the upper baffle 18 include, but are not limited to, aluminized steel, stainless steel, and porcelanized steel. Examples of materials suitable for use in forming the ring burner 36 include, but are not limited to, stainless steel, aluminized steel, and porcelanized steel.

Consequently, the total weight of an inventive single cavity apparatus 10 sized for cooking a 25 lb. turkey can be as much as 5 lbs. less (typically from about 5 lbs. to about 3 lbs. less) than the weight of a correspondingly sized prior art double cavity broiler.

In addition, tests run on an inventive single cavity apparatus 10 of this size have shown that, at an exhaust gas temperature of 720° F., it takes less than 14 minutes (typically not more than 13 minutes) to reach an equilibrium infrared radiant cooking emission level of 5.5 KW/m$^2$ within the cooking cavity 14 of the inventive apparatus 10. These surprising and unexpected results compare very favorably to the test results on the prior art double cavity apparatus which required 16 minutes to reach a much lower equilibrium radiant energy emission level in the cooking cavity of 4.3 KW/m$^2$. Also, the fuel/energy requirements for the prior art and inventive apparatuses tested were substantially the same at 18,738 BTU/hr for the prior art double cavity system and 18,789 BTU/hr for the inventive single cavity apparatus 10.

In fact, the inventive single cavity apparatus 10 will preferably reach an infrared emission level of 4.3 KW/m$^2$ in the cooking cavity 14 in not more than 10 minutes, more preferably not more than 8 minutes, at an exhaust temperature of not more than 720° F. (more preferably not more than 700° F.). In accordance with the Stefan-Boltzmann equation, the test results for the inventive single cavity apparatus 10 indicated that an infrared emission level of 4.3 KW/m$^2$ was reached in less than 7.5 minutes at an exhaust temperature of less than 680° F.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the invention as defined by the claims.

What is claimed is:

1. An apparatus for cooking comprising:
a cooking cavity for receiving a food item, said cooking cavity having a vertically extending interior surface which will surround and face said food item when said food item is received in said cooking cavity and
a burner positioned within a bottom portion of said cooking cavity for delivering a combustion gas in said cooking cavity such that said combustion gas will flow upwardly in said cooking cavity and will heat said vertically extending interior surface of said cooking cavity so that infrared radiation will be emitted from said vertically extending interior surface of said cooking cavity,
wherein, when said food item is positioned in said cooking cavity, at least a portion of said infrared radiation emitted from said vertically extending interior surface of said cooking cavity will be received from said vertically extending interior surface of said cooking cavity by said food item to heat said food item by radiant heat transfer,
as said combustion gas flows upwardly in said cooking cavity, a portion of said combustion gas will also diffuse inwardly in said cooking cavity to contact and heat said food item by convective heat transfer, and
said burner is configured and oriented for delivering said combustion gas in said cooking cavity to heat said vertically extending interior surface of said cooking cavity in a manner such that said apparatus will cook said food item in said cooking cavity predominantly by infrared radiation.

2. The apparatus of claim 1 wherein:
said cooking cavity has a top opening at an upper end thereof for receiving said food item;
said apparatus further comprises a cover removably positionable over said top opening; and
said cover has a plurality of perforations for discharging said combustion gas from said cooking cavity,
wherein said perforations are located in a peripheral portion of said cover in a manner such that, when said cover is placed over said top opening, said perforations will be positioned adjacent an upper end of said vertically extending interior surface and will reduce said portion of said combustion gas which diffuses inwardly in said cooking cavity and contacts said food item.

3. The apparatus of claim 2 wherein said cover comprises a substantially conical baffle which diverges upwardly toward said perforations.

4. The apparatus of claim 2 wherein:
said vertically extending interior surface of said cooking cavity is substantially cylindrical;
said perforations are configured in a ring arrangement in said peripheral portion of said cover; and
said burner is a ring burner positioned adjacent to said vertically extending interior surface.

5. The apparatus of claim 1 wherein:
said apparatus further comprises a baffle plate positioned in a lower portion of said cooking cavity;
said baffle plate has a peripheral edge which is spaced apart from said vertically extending interior surface such that a gap is formed between said peripheral edge of said baffle plate and said vertically extending interior surface;
said gap surrounds said baffle plate and is positioned elevationally above said burner; and
said combustion gas from said burner is delivered upwardly through said gap.

6. The apparatus of claim 5 wherein:
said vertically extending interior surface of said cooking cavity is substantially cylindrical and
said baffle plate has an upwardly diverging conical or frusto-conical shape.

7. The apparatus of claim 6 wherein said burner is a ring burner positioned adjacent to said vertically extending interior surface.

8. The apparatus of claim 5 wherein said combustion gas is delivered through said gap in an upward flow such that said upward flow of said combustion gas surrounds said peripheral edge of said baffle plate.

9. An apparatus for cooking comprising:
a cooking cavity having a top opening for receiving a food item, said cooking cavity having a vertically extending interior surface which will surround and face said food item when said food item is received in said cooking cavity;
a burner positioned within a bottom portion of said cooking cavity for delivering a combustion gas in said cooking cavity;
a baffle plate positioned in a lower portion of said cooking cavity, said baffle plate having a peripheral edge which is spaced apart from said vertically extending interior surface of said cooking cavity such that a gap is formed between said peripheral edge of said baffle plate and said vertically extending interior surface, said gap substantially surrounding said baffle plate and said gap being elevationally positioned above said burner; and
a cover removably positionable over said top opening of said cooking cavity, said cover having a plurality of perforations for discharging said combustion gas from said cooking cavity,
wherein said burner and said baffle plate are configured and positioned such that said combustion gas will be delivered in said cooking cavity through said gap in an upward flow which will substantially surround said peripheral edge of said baffle plate,
said upward flow of said combustion gas in said cooking cavity will heat said vertically extending interior surface of said cooking cavity so that infrared radiation will be emitted from said vertically extending interior surface of said cooking cavity,
when said food item is positioned in said cooking cavity, at least a portion of said infrared radiation emitted from said vertically extending interior surface of said cooking cavity will be received from said vertically extending interior surface of said cooking cavity by said food item to heat said food item by radiant heat transfer,
as said combustion gas flows upwardly in said cooking cavity, a portion of said combustion gas will also diffuse inwardly in said cooking cavity to contact and heat said food item by convective heat transfer, and
wherein said burner, said baffle plate, and said perforations are also configured and positioned so that said apparatus will heat said vertically extending interior surface of said cooking cavity in a manner such that at least 50% of all cooking energy delivered to said food item in said cooking cavity will be infrared energy.

10. The apparatus of claim 9 wherein said burner, said baffle plate, and said perforations are configured and positioned so that said apparatus is operable for causing said upward flow of said combination gas from said gap to heat said vertically-extending interior surface such that at least 55% of all cooking energy delivered to said food item in said cooking cavity will be infrared energy.

11. The apparatus of claim 9 wherein said upward flow of said combustion gas from said gap will heat said vertically extending interior surface in a manner such that, at an exhaust gas temperature of not more than 720° F., an infrared radiant emission level of at least 4.3 KW/m$^2$ in said, cooking cavity is reached in not more than 10 minutes.

12. The apparatus of claim 9 wherein said vertically extending interior surface of said cooking cavity is formed of aluminized steel.

13. The apparatus of claim 9 wherein said vertically extending interior surface of said cooking cavity is cylindrical.

14. The apparatus of claim 13 wherein said burner is a ring burner positioned adjacent to said vertically extending interior surface of said cooking cavity.

15. The apparatus of claim 14 wherein said baffle plate has an upwardly diverging conical or frusto-conical shape.

16. The apparatus of claim 15 wherein said peripheral edge of said baffle plate is circular.

17. The apparatus of claim 9 wherein said upward flow of said combustion gas from said gap will heat said vertically-extending interior surface in a manner such that, at an exhaust gas temperature of not more than 700° F., an infrared radiant emission level of at least 4.3 KW/m$^2$ in said cooking cavity is reached in not more than 8 minutes.

18. The apparatus of claim 9 wherein said vertically-extending interior surface is an interior surface of a vertically-extending wall and wherein said upward flow of said combustion gas from said gap will heat said vertically extending interior surface in a manner such that an infrared radiant emission level of at least 5 KW/m$^2$ in said cooking cavity will be provided without said vertically extending wall exceeding a temperature of 650° F.

19. The apparatus of claim 9 wherein said vertically-extending interior surface is an interior surface of a vertically-extending wall and wherein said upward flow of said combustion gas from said gap will heat said vertically extending interior surface in a manner such that an infrared radiant emission level of at least 5 KW/m$^2$ in said cooking cavity will be provided without said vertically extending wall exceeding a temperature of 600° F.

20. An apparatus for cooking comprising:
a cooking cavity for receiving a food item, said cooking cavity having a vertically extending interior surface which will surround and face said food item when said food item is received in said cooking cavity and
a burner positioned within a bottom portion of said cooking cavity for delivering a combustion gas in said cooking cavity which will flow upwardly to heat said vertically extending interior surface,
wherein said burner is configured and oriented for delivering said combustion gas in said cooking cavity to heat said vertically extending interior surface in a manner effective such that said apparatus is operable for cooking said food item in said cooking cavity at least predominantly by infrared radiation,
said cooking cavity has a top opening at an upper end thereof for receiving said food item,
said apparatus further comprises a cover removably positionable over said top opening,
said cover has a plurality of perforations for discharging said combustion gas from said cooking cavity,
wherein said perforations are located in a peripheral portion of said cover in a manner effective such that, when said cover is placed over said top opening, said perforations will be positioned adjacent said vertically extending interior surface and will operate to at least reduce an amount of said combustion gas which diffuses inwardly in said cooking cavity and contacts said food item, and
said cover comprises a substantially conical baffle which diverges upwardly toward said perforations.

* * * * *